March 9, 1926. 1,576,340
H. E. LE·PROVOST
SYSTEM OF PHOTOGRAPHIC APPARATUS WITH CURVED FOCUS
Filed March 6, 1924 2 Sheets-Sheet 2

Patented Mar. 9, 1926.

1,576,340

UNITED STATES PATENT OFFICE.

HENRI EMILE LE PROVOST, OF ARGENTEUIL, FRANCE.

SYSTEM OF PHOTOGRAPHIC APPARATUS WITH CURVED FOCUS.

Application filed March 6, 1924. Serial No. 697,362.

*To all whom it may concern:*

Be it known that I, HENRI EMILE LE PROVOST, of 145 Grande Rue, Argenteuil, Seine et Oise, France, photographist, have invented Systems of Photographic Apparatus with Curved Focus, of which the following is a full, clear, and exact description.

The objectives of the Petzval type, the price of which is relatively small, give very luminous and detailed images, but they have the great inconvenience of giving from a plane object a curved image, this image being approximately spherical. As the plates and films used up to this day in photography are plane sensitive surfaces, alone the central portion of the image produced with a Petzval objective can be practically used for impressing them.

The invention is adapted to remedy these inconveniences by causing the film to take as much as possible the shape of the image. For increasing in a determined direction, the horizontal direction for instance, the useful field of a photographic apparatus provided with an objective of this kind, the film will be fitted on a cylindrical film-carrier the directrix of which is an arc of a circle having a radius approximately equal to that of the sphere on which the image is projected; but, for enlarging, in all directions, the useful field of the apparatus, as it is not possible to cause the film to take a spherical shape, use will be made, for impressing it, of an apparatus of determined type forming more particularly the subject-matter of the present invention and substantially characterized by the following points:

1. The film to be impressed is carried by a cylindrical film-carrier of which it takes the shape.

2. The objective rocks about an axis and draws along with it a movable dark camera terminating in a part in which is provided a slot in the shape of an arc of a circle.

3. The film-carrier is provided with an adjustable operating device which, while the objective and dark camera rock, successively presents in front of the slot the different portions of the film in a position approximately at right angles to the axis of the objective at this moment, in such a manner that all these portions of the film may be successively impressed when they are tangent to the sphere on which the image is projected.

In order that the invention may be clearly understood, a form of construction of an apparatus of this type is illustrated, by way of example only, in the accompanying drawing in which.

Figure 1:
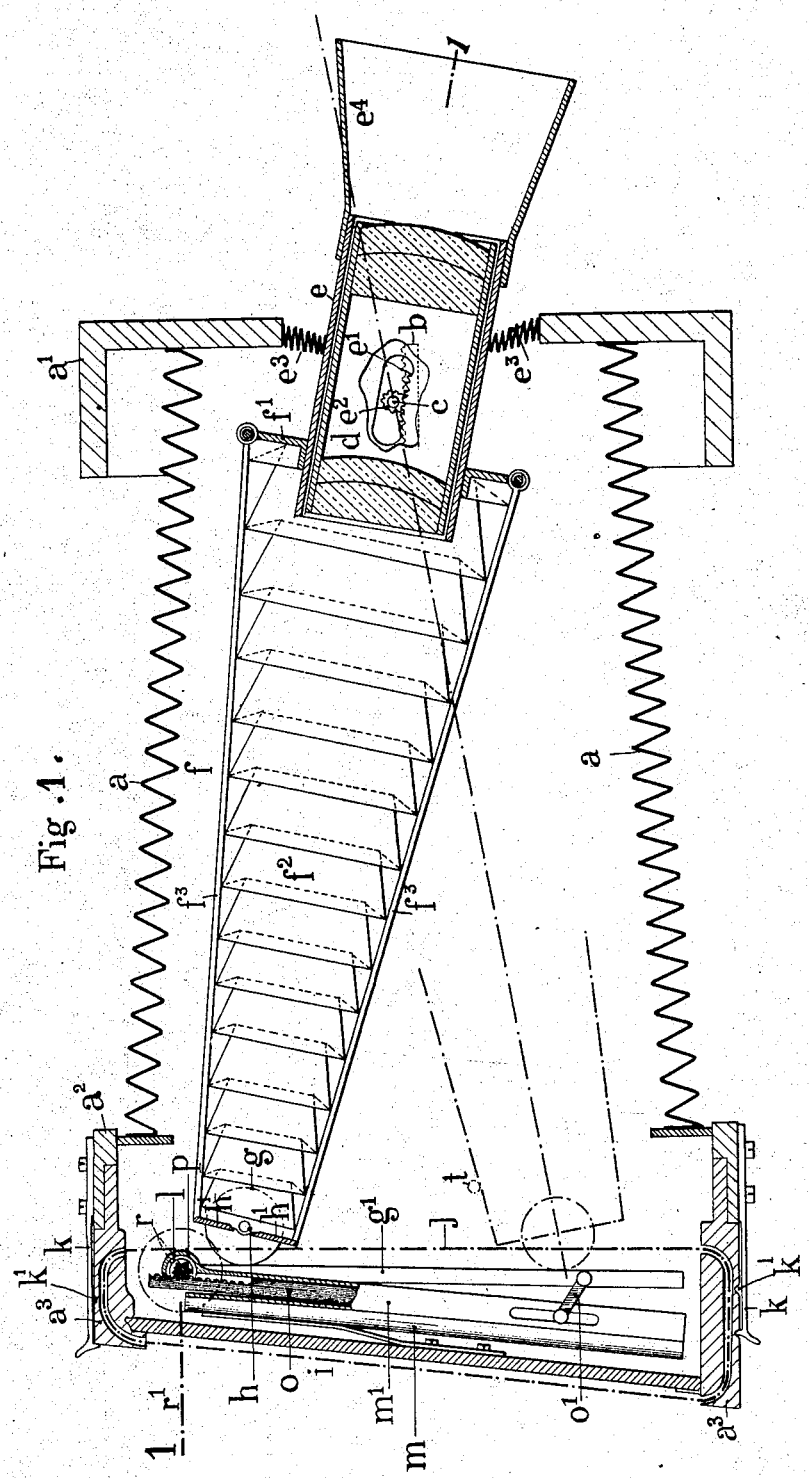
Fig. 1 is a longitudinal section of the apparatus.
Figure 2:
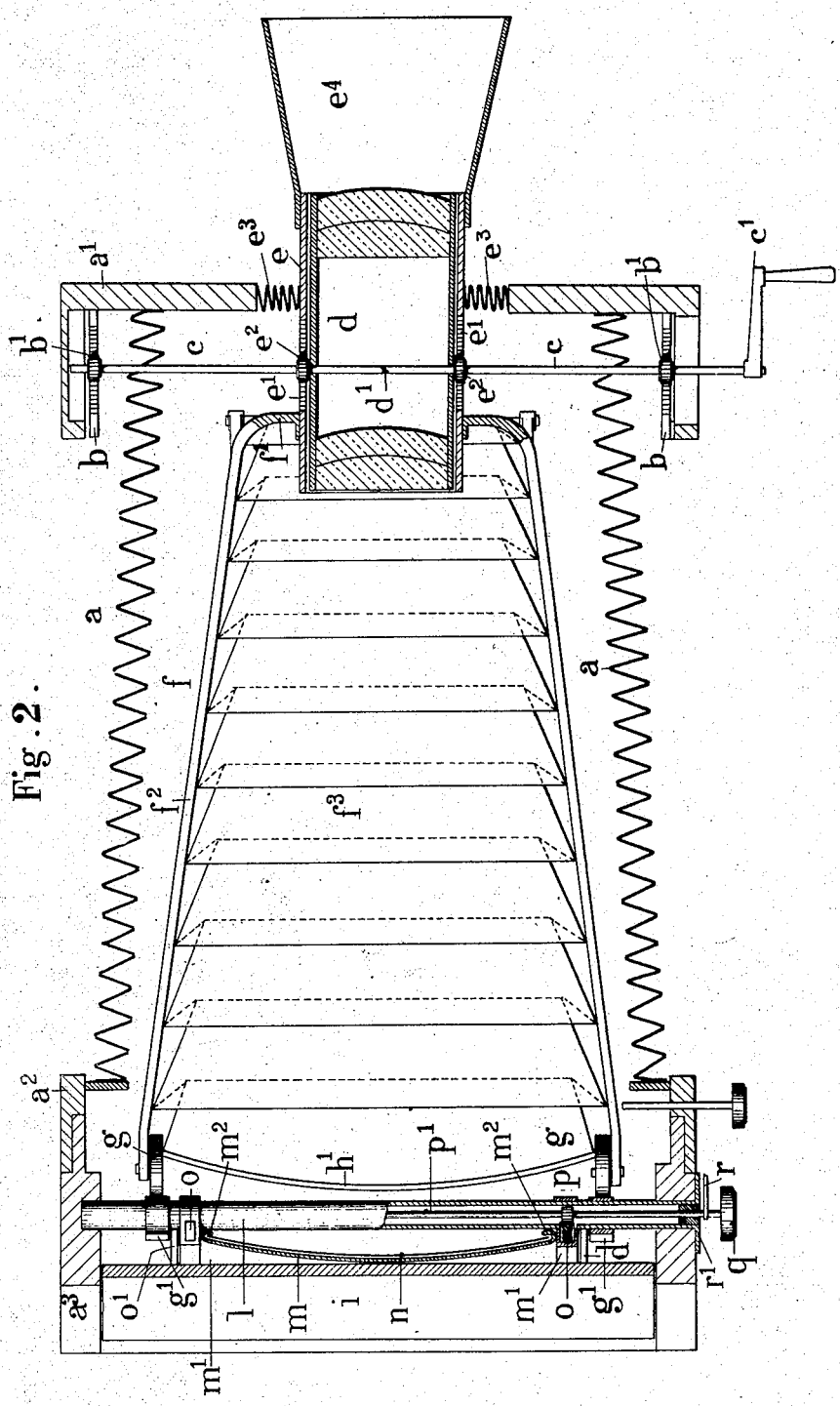
Fig. 2 is a view according to line 1—1 of the same apparatus.

As shown in these figures the apparatus illustrated comprises a dark camera $a$ held by a front frame $a^1$ and a rear frame-work composed of a fixed frame $a^2$ and a removable film-holder $a^3$. The front frame $a^1$ carries two horizontal racks $b$ with which gear two pinions $b^1$ rigidly secured on an axis $c$ actuated by a crank $c^1$. The objective $d$ is loosely mounted and can freely rock on this axis which passes through its optical center $d^1$.

On the other hand, this objective can slide with slight friction in a tube $e$ through which the axis passes through two apertures the lower ledge of which forms a rack. On the axis $c$ at the level of these apertures, are rigidly secured two pinions $e^2$ which gear with the racks $e^1$ and are similar to the pinions $b^1$, so that when turning the crank $c^1$, the axis $c$ moves drawing the objective along with it, but the position of the tube $e$ relatively to the fixed frame $a^1$ does not vary. The tube $e$ is moreover connected to the frame $a^1$ by a flexible and opaque diaphragm $e^3$ and carries at its end a sun-shading device $e^4$ which will serve as a counter-weight for regulating the speed at which the objective $d$ will rock about the axis $c$.

Finally, on the tube $e$ is locked the front part $f^1$ of a movable dark camera $f$ which flattens and widens at its rear end, but the walls of which are arranged as illustrated in the drawing so as not to reflect the light towards this end. The two side parts $f^2$ of the movable dark camera are integral with the front part and carry at their rear ends two rollers $g$. The upper and lower parts $f^3$ of the dark camera are jointed to the front part and can either open and be hooked separately at the top and at the bottom of the rear framework or engage with each other so as to re-close the dark camera $f$. Each of these part $f^3$ is provided at its lower end, which is curved, with a ledge $h^1$.

When the two parts $f^3$ are engaged together, their two ledges $h^1$ leave only between them a slot $h$ in the shape of an arc of a circle, the radius of which is approximately equal to the distance separating the slot from the optical center $d^1$ of the objective, so that, when the objective rocks about the axis $c$ and draws the dark camera along with it, this slot describes approximately a sphere.

The rear removable film-holder $a^3$ of the dark camera $a$ is provided with a shutter $i$ and a curtain $j$ and is retained against the fixed frame $a^2$ by means of springs $k$. These springs can not only lock the removable film-holder $a^3$ in the position illustrated, but, when they are projecting in the notches $k^1$, they can also hold it in such a position that the rollers $g$ do not come in contact with the curtain $j$ when it is pulled down on the front of the removable film-holder.

At the upper part of the removable film-holder $a^3$ is internally secured a hollow axis $l$ which carries, on the one hand, two rectilinear guides $g^1$ rendered integral with each other and arranged opposite the rollers $g$ and, on the other hand, the side supports $m^1$ of a film-carrier $m$ having a circular cylindrical shape. This film-carrier is provided with ledges $m^2$ between which is slidden the film $n$ which, in these conditions, takes the cylindrical shape of the film-carrier and takes a radius of curvature approximately equal to the distance separating it from the optical center $d^1$.

In each of the supports $m^1$ of the film-carrier is fitted a rod $o$ jointed at its lower part to one of the guides $g^1$ through the medium of a rigid arm $o^1$ and provided, at its upper part, with a rack gearing with a pinion $p$ rigidly secured on a rod $n^1$ inserted within the hollow axis $l$. The rod $p^1$ projects outside the frame and is provided with a milled knob $q$ and an index $r$ moving in front of a sector $r^1$.

By operating the milled knob $q$, the rack $o$ and the arm $o^1$ are acted upon and the angle formed by the guides $g^1$ with the generatrices of the film-carrier $m$ is thus caused to vary; at each position of the index $r$ marked on the sector $r^1$ corresponds a determined locking angle. The guides and the film-carrier form therefore a single structure which, when the objective will rock about the axis $c$, will be subjected to the action of the rollers $g$ running on the guides $g^1$ and to the reaction of a spring $s$ secured to the shutter $i$ so as to constantly push the film-carrier, and will pivot about the axis $l$ which carries it.

For focussing, use is made of another removable frame similar to the frame-holder $a^3$ but in which the film-carrier is replaced by a spherical screen. The upper and lower parts $f^3$ of the movable dark camera are moved apart and they are secured to the frame so as to lock the objective in a horizontal position. The image is entirely projected on the screen and it can thus be seen in its entirety. By means of the crank $c^1$, the objective is then caused to slide in the tube $e$, so as to focus a portion of the object projected in the top of the screen; then, by means of the milled knob $q$, the locking angle of the screen and guides $g^1$ is caused to vary so as to focus the portion of the object projected in the bottom part of the screen, as this portion of the object can be at a distance from the objective different from that for which the first focussing has been effected.

The position of the index $r$ on the sector $r^1$ is marked and, after having engaged together the two ledges $h^1$ so as to reclose the movable dark camera and to hold the latter in the bottom of the objective by means of a suitable device diagrammatically illustrated by a small bolt $t$, the removable frame containing the screen is replaced by the frame containing the non-impressed film. For that purpose, after having brought the index $r$ of the sector $r^1$ of the new frame in the position marked on the previous one, the removable frame is fitted in the framework $a^2$ so that the springs $k$ enter in the notches $k^1$ and the curtain $j$ is lifted; the removable frame can then be locked in the position illustrated in the drawing.

The objective is then uncovered and at the same time the bolt $t$ is released; the objective rocks by its own weight about its optical center at a speed which depends on the position of the sun-shading device $e^4$ on the tube $e$ and which will be rendered uniform by the pneumatic brake formed by the movable dark camera moving in the fixed dark camera. During the rocking movement, the guides $g^1$, pressed against the rollers $g$ by the springs $s$, will pivot about the axis $l$ and, drawing along the film-carrier, will successively present the different portions of the non-impressed film to the action of the light rays passing through the slot $h$. When the rocking movement of the objective will be terminated, the image, previously focussed on the screen, will be integrally reproduced on the sensitive surface the different portions of which have been successively presented in positions similar to those in which were simultaneously placed, upon focussing, the different portions of the screen.

With an apparatus of this type, by increasing the angle according to which rocks the objective and the angle at the center of the cylinder formed by the film, the useful field of the apparatus can be extended without prejudice for the fineness of the image.

It is to be understood that the apparatus described above is given by way of example only; for increasing the useful field in a determined direction, it suffices, without determining the rocking movement of the objective, to use a resilient cylindrical film-carrier the curvature of which can be adjusted by any suitable means; in the same way, in the apparatuses of the type illustrated which permit to extend the field in all directions, the forms, dimensions, materials used and all detail arrangements can be varied without departing thereby from the principle of the invention.

Claims.

1. In a photographic apparatus, an objective adapted to give a curved image from a plane object and rotatable about an axis, a curved film carrier associated with said objective, the generatrix of curvature of the film carrier being at right angles to the axis about which the objective rotates, a film mounted on said carrier and curved similarly to the latter, and means for causing the film carrier to rotate about an axis parallel to the first mentioned one, during the rotary movement of the objective.

2. In a photographic apparatus, an objective adapted to give a curved image from a plane object and turnable by its own weight about a horizontal axis, a fixed dark camera extending rearwardly from said objective, a curved film carrier arranged at the rear of said dark camera and having the vertical generatrix arranged about a vertical axis, a film supported by the carrier and curved similarly to the latter, a movable dark camera arranged in the fixed camera and perforated at its rear end with a slot in the shape of an arc of a circle and situated in a plane in alignment with the main axis of the objective and the axis about which it rocks, said movable dark camera by rocking with the objective to which it is fixed, causing the film carrier to rock on the axis which carries it.

3. In a photographic apparatus, an objective rotatable about a horizontal axis, a fixed dark camera extending rearwardly from the objective, a curved film carrier arranged at the rear end of said dark camera and having a vertical generatrix, a horizontal axle supporting said film carrier, a film supported by the carrier and curved similarly to the latter, a movable dark camera arranged within the fixed camera and provided at its rear end with an arc-shaped slot, means actuated by the movable dark camera for causing the film carrier to rock on said axle when the movable dark camera rocks with the objective, and means for causing the objective to slide in the movable dark camera without changing the respective positions of the two dark cameras relatively to each other.

4. In a photographic apparatus, an objective rockable on a horizontal axis, a fixed dark camera extending rearwardly from the objective, a curved film carrier having a vertical generatrix, a horizontal axle supporting said carrier, a film mounted on the carrier and curved similarly to the latter, a movable dark camera within the fixed camera and having an arc-shaped slot in its rear end, means actuated by the movable dark camera for causing the film carrier and film to rock about said axle when the objective rocks about its axis, racks mounted on the fixed dark camera, similar racks mounted on the movable dark camera, an axle coaxial with the axis about which the objective rocks, pinions mounted on the last mentioned axle and engaging said racks, and means for rotating the last mentioned axle to cause the objective to slide in the movable dark camera without changing the respective positions of the two dark cameras relatively to each other.

5. In a photographic apparatus, an objective rockable about a horizontal axis, a fixed dark camera extending rearwardly from the objective, a movable dark camera fixed to the objective and arranged within the fixed dark camera, the rear end of said movable dark camera being provided with an arc-shaped slot, rollers arranged on said movable dark camera, a curved film carrier mounted within the fixed dark camera and arranged rearwardly of the movable dark camera, a horizontal shaft supporting said film carrier, resilient means for swinging the film carrier about its shaft toward said movable dark camera, guides mounted on said shaft and contacting with said rollers and adapted when the movable dark camera rocks about the rocking axis of the objective to cause the film carrier to move, and means for causing the angle of said guides relatively to the film carrier to vary.

6. In a photographic apparatus, an objective rockable about a horizontal axis, a fixed dark camera extending rearwardly from the objective, a movable dark camera arranged in the fixed camera and having its front end fixed to the objective, said movable camera being provided at its rear end with an arc-shaped slot, rollers arranged on the movable camera, a curved film carrier, a horizontal shaft supporting the film carrier, resilient means for forcing the carrier toward the front of the apparatus, guides mounted on said axle and engaging said rollers, said guides cooperating with the film carrier to move the same away from the movable camera when the latter rocks about the rocking axis of the objective, supports for the film carrier, racks slidable in said supports, arms pivotally connecting the guides and supports, pinions gearing with said racks and mounted on said shaft, and a handle to permit the shaft to be rotated.

7. In a photographic apparatus, an objective rockable on a horizontal axis, a fixed dark camera extending rearwardly from the objective, a movable dark camera within the fixed camera and provided at its rear end with a curved wall, said curved wall having a substantially horizontally disposed slot arranged therein, rollers carried by the movable camera, said movable camera being flattened at its rear part and having its walls so arranged as to prevent light coming from the front end toward the rear end, a curved film carrier arranged at the rear end of the fixed camera, a horizontal shaft supporting the film carrier, resilient means for moving the film carrier toward the front of the apparatus, guides carried by said shaft, engaged by said roller and operatively connected to the film carrier, for causing the film carrier to move rearwardly about said shaft when the movable camera turns about the rocking axis of the objective, and means for varying the angle of the guides relatively to the film carrier.

The foregoing specification of my "system of photographic apparatus with curved focus" signed by me this 23rd day of February, 1924.

HENRI EMILE LE PROVOST.